US005985982A

United States Patent [19]

Shipston et al.

[11] Patent Number: 5,985,982
[45] Date of Patent: Nov. 16, 1999

[54] PRINTABLE RELEASE

[75] Inventors: Adele C. Shipston, Williamsville; David K. Rice, II, N. Tonawanda, both of N.Y.

[73] Assignee: Moore Business Forms, Inc., Grand Island, N.Y.

[21] Appl. No.: 09/179,246

[22] Filed: Oct. 26, 1998

Related U.S. Application Data

[63] Continuation of application No. 08/806,855, Feb. 26, 1997, Pat. No. 5,874,499, which is a continuation of application No. 08/479,976, Jun. 7, 1995, abandoned, which is a division of application No. 08/189,632, Feb. 1, 1994, Pat. No. 5,478,880.

[51] Int. Cl.$^6$ ............................. C08J 77/00; C08K 77/00; C08L 77/00
[52] U.S. Cl. ......................... 524/515; 524/529; 524/533; 524/155; 428/41.5; 428/41.8; 428/195; 428/200; 428/201; 428/352; 428/354; 428/355 R
[58] Field of Search ................................. 524/515, 529, 524/533, 155; 428/41.8, 41.5, 195, 200, 207, 352, 354, 355 R

[56] References Cited

U.S. PATENT DOCUMENTS

| | | |
|---|---|---|
| 2,647,843 | 8/1953 | Bemmels . |
| 2,888,419 | 5/1959 | Safford . |
| 2,897,960 | 8/1959 | Revoir . |
| 2,912,348 | 11/1959 | Lavanchy . |
| 2,992,201 | 7/1961 | Gober . |
| 3,390,208 | 6/1968 | Montgomery . |
| 3,442,837 | 5/1969 | Brotz et al. . |
| 3,458,468 | 7/1969 | Tapp . |
| 3,475,196 | 10/1969 | Bartell et al. . |
| 3,531,316 | 9/1970 | Sternasty . |
| 3,543,920 | 12/1970 | Crocker et al. . |
| 3,549,482 | 12/1970 | Okutani . |
| 3,607,341 | 9/1971 | Goins et al. . |
| 3,652,314 | 3/1972 | Castner . |
| 3,691,257 | 9/1972 | Kendrick et al. . |
| 3,788,941 | 1/1974 | Kupits . |
| 3,860,540 | 1/1975 | Abel et al. . |
| 3,870,546 | 3/1975 | Gelsomino . |
| 3,873,352 | 3/1975 | Kitaj . |
| 3,882,060 | 5/1975 | Guzy . |
| 4,048,380 | 9/1977 | Blakey et al. . |
| 4,057,662 | 11/1977 | Johnson et al. . |
| 4,070,523 | 1/1978 | Blum et al. . |
| 4,084,026 | 4/1978 | Gandia . |
| 4,133,774 | 1/1979 | Brynko et al. . |
| 4,279,964 | 7/1981 | Heller ........................................ 428/496 |
| 4,287,108 | 9/1981 | Grigo et al. . |
| 4,331,736 | 5/1982 | Schafer et al. . |
| 4,440,830 | 4/1984 | Wempe . |
| 4,504,619 | 3/1985 | Chang et al. . |
| 4,536,422 | 8/1985 | Harper, Jr. . |
| 4,576,610 | 3/1986 | Donenfeld . |
| 4,579,223 | 4/1986 | Otsuka et al. . |
| 4,585,497 | 4/1986 | Webster . |
| 4,618,512 | 10/1986 | Harper, Jr. . |
| 4,664,416 | 5/1987 | Steidinger . |
| 4,728,571 | 3/1988 | Clemens et al. . |
| 4,767,646 | 8/1988 | Cordova et al. . |
| 4,803,194 | 2/1989 | Bracewell . |
| 4,880,678 | 11/1989 | Goffi . |
| 4,921,882 | 5/1990 | Senich . |
| 4,927,709 | 5/1990 | Parker et al. . |
| 4,931,492 | 6/1990 | Foster et al. . |
| 4,935,300 | 6/1990 | Parke et al. . |
| 5,064,908 | 11/1991 | Schuster et al. . |
| 5,073,457 | 12/1991 | Blackwell . |
| 5,095,067 | 3/1992 | Hara et al. . |
| 5,115,029 | 5/1992 | Kirkpatrick et al. . |
| 5,154,962 | 10/1992 | Mertens et al. . |
| 5,169,900 | 12/1992 | Gudelis . |
| 5,210,121 | 5/1993 | Hinterwaldner . |
| 5,217,793 | 6/1993 | Yamane et al. . |
| 5,238,644 | 8/1993 | Boulanger et al. . |
| 5,238,731 | 8/1993 | Blanch et al. . |
| 5,246,756 | 9/1993 | All et al. . |
| 5,248,535 | 9/1993 | Chang et al. . |
| 5,250,336 | 10/1993 | Greuse et al. . |
| 5,304,425 | 4/1994 | Padgett . |
| 5,310,772 | 5/1994 | Blanch et al. . |
| 5,320,780 | 6/1994 | Unruh . |
| 5,478,880 | 12/1995 | Shipston et al. ........................ 524/527 |
| 5,543,192 | 8/1996 | Shipston et al. ........................ 524/515 |
| 5,621,030 | 4/1997 | Shipston et al. ........................ 524/157 |
| 5,709,976 | 1/1998 | Malhotra ................................ 430/124 |
| 5,874,499 | 2/1999 | Shipston et al. ........................ 524/506 |
| 5,885,678 | 3/1999 | Malhotra ................................ 428/41.8 |

FOREIGN PATENT DOCUMENTS

| | | |
|---|---|---|
| 58-203176 | 5/1982 | Japan . |
| 337457 | 5/1972 | U.S.S.R. . |
| 1 293 797 | 10/1972 | United Kingdom . |
| WO 88/07931 | 10/1988 | WIPO . |
| WO 92/04409 | 3/1992 | WIPO . |
| WO 93/14932 | 8/1993 | WIPO . |

OTHER PUBLICATIONS

Derwent Abstract No. 86–202436.
Derwent Abstract No. 92–212096.
Notification of Transmittal and International Search Report including Annex, PCT/US 95 00539 dated May 24, 1995.

*Primary Examiner*—Duc Truong
*Attorney, Agent, or Firm*—Finnegan, Henderson, Farabow, Garrett & Dunner

[57] ABSTRACT

The present invention is directed to a printable release composition used for pressure sensitive labels and the like. The invention is also directed to an article, such as a label, that comprises a substrate such as paper, optionally a thermal transfer primer coating coated onto the substrate and a release layer coated onto the transfer primer coating or onto the substrate. The printable release composition of the present invention may be used with labels having permanent, repositionable or removable adhesives. The particular composition of the release layer depends on the type of adhesive that is appropriate for the desired end use.

21 Claims, No Drawings

PRINTABLE RELEASE

This is a continuation of application Ser. No. 08/806,855, filed Feb. 26, 1997, now U.S. Pat. No. 5,514,499, which is a continuation of application Ser. No. 08/479,976, filed Jun. 7, 1995, now abandoned, which is a divisional of application Ser. No. 08/189,632, filed Feb. 1, 1994, now U.S. Pat. No. 5,478,880, all of which are incorporated herein by reference.

BACKGROUND OF THE INVENTION

1. Field of the Invention

The present invention relates to printable release compositions for pressure sensitive adhesive articles, such as labels, and to articles containing such release compositions.

2. Description of the Prior Art

Many types of adhesive articles are known, such as labels, tapes, and note pads. Labels, in particular, are used for business forms, files, advertising, and the like. Labels come in a variety of shapes and sizes, such as window labels, machine labels, integrated labels and the like. Integrated labels are physically integrated, during manufacture, with business forms, mailings and the like.

The type of adhesive best suited for use with a particular article depends on the article's ultimate use. The adhesive may be repositionable, permanent or removable. For instance, it may be desirable for some applications to permanently affix an article to an object, for example, a label applied to a file folder. Such applications require a permanent adhesive. A repositionable adhesive, on the other hand, can be applied to an object, removed, and reapplied. Pads of notes, for example, NoteStix or PostIt notes, are examples of articles using repositionable adhesives. CleanTac is an example of a label having a repositionable adhesive. Finally, removable adhesives are appropriate when the article is to be removed after use, but is generally not reusable. Removable adhesives may, however, also include adhesives which become permanent over time.

Regardless of their use, adhesive articles must be stored and readily available for use. Such articles may utilize a separate disposable liner in juxtaposed face-to-face contact with the adhesive substrate with a release material coated on the side of the liner in contact with the adhesive side of the adhesive substrate. Just prior to use, the liner is peeled away from the adhesive. Such an adhesive article is often referred to as a "linered" label. Alternatively, the adhesive article may be a substrate coated on one side with a release material and coated on the opposite side with an adhesive material. Such a linerless label can be stored in pads or rolls.

The release coating facilitates either the removal of the adhesive-coated substrate from the liner or the pad or the unwinding the linerless label from the roll. The release coating needs to have sufficient adhesion to keep, for example, the linered label on its backing, or the linerless label on a pad or in a roll, but must have sufficient release properties to allow the label to be removed from the backing or pad or to be unwound from the roll, while maintaining its adhesive property.

For some time there have been problems in producing a release coating that possesses the above properties and that, additionally, contains printed matter. One problem relates to retaining the tenacity of the printed matter on the substrate so that the printed matter is not pulled off by the adhesive or wiped off by contact occasioned by someone rubbing against or applying the label. Another problem is "fill-in" of letters such as "o", "a", "e", etc. Fill-in occurs when the porosity of the substrate is not sufficient to absorb the ink and the ink has a tendency to feather out. Wipe-off and related problems may occur if the porosity of the substrate is too low and the ink does not dry sufficiently.

As an example of the above-mentioned problems, a release coating may be used for the printing of Postnet barcodes and FIM codes for automated mail processing. Postnet (Numerical Encoding Technique) is used to encode the ZIP code or ZIP+4 code on an envelope and is located in the lower right portion of a mail piece. FIMs (Facing Identification Marks) are used to identify Business Reply Mail and are a series of vertical bars printed in the upper middle portion of the mail piece just to the left of the postage indicia. FIMs greatly facilitate the automated processing of the mail; thus the quality and placement of the barcodes is very critical to the success of automated processing techniques. For instance, in a linerless label application, the barcode or barcodes are printed on the release surface of a substrate. If feathering or wipe off of the printed indicia occurs, then the information contained in the respective barcodes cannot be scanned. This may result in the loss of the cheaper bulk mailing rate. Standard postage for each piece must then be paid, increasing the cost to the customer, and the mail must be mechanically sorted, causing delay.

In the case of thermal transfer printing, not only is a high surface energy preferred, but the surface must be very smooth. Most thermal-substrates contain clay coatings with relatively high surface energy and bending properties to enhance ink transfer and anchorage. A release coating imparts a lower surface energy to the face of the label for better release characteristics, making printing much more difficult. Thus, higher surface energy provides higher print quality, whereas lower surface energy provides for better release characteristics. Thus, there is a need for a printable release coating having both a good quality print and good release characteristics.

SUMMARY OF THE INVENTION

The present invention relates to printable release compositions for use with pressure sensitive adhesive articles, particularly labels. The release compositions provide appropriate release properties for the different adhesives: repositionable, permanent and removable.

The present invention is directed to a composition for uses as a release layer for a permanent adhesive comprising a mixture of:

(a) about 50 to about 95 parts by weight polyethylene; and (b) about 5 to about 20 parts by weight silicon emulsion.

The present invention is also directed to a composition for use as a release layer for a repositionable adhesive comprising a mixture of:

(a) a major amount of ethylene vinyl chloride copolymer; and (b) a minor amount of polyethylene emulsion.

In another embodiment, the present invention is directed to a composition for use as a release layer for a repositionable adhesive comprising:

(a) about 10 to about 80 parts by weight of a surfactant; and (b) about 20 to about 90 parts by weight of an acrylic polymer.

In a further embodiment, the present invention is directed to an article comprising a substrate, a thermal transfer primer coating on the substrate, and a release layer on the thermal transfer primer coating wherein the thermal transfer primer coating comprises:

(a) about 20 to about 50 parts by weight of a latex; and (b) about 50 to about 80 parts by weight pigment.

Additional advantages of the invention will be set forth in part in the description which follows, and in part will be obvious from the description, or may be learned by the practice of the invention. The advantages of the invention may be realized and obtained by means of the elements and combinations particularly pointed out in the claims.

It is to be understood that both the foregoing general description and the following detailed description are exemplary and explanatory only and are not restrictive of the present invention as claimed.

DETAILED DESCRIPTION OF THE PREFERRED EMBODIMENTS

The present invention is directed to an ink jet, video jet, and the like, printable release composition for use with pressure sensitive adhesives, such as labels and the like. The invention is also directed to an article, such as a label, that comprises a substrate such as paper, optionally a thermal transfer primer coating coated onto the substrate, and a release layer coated onto the thermal transfer primer coating or onto the substrate. The label may be either linerless or linered. The printable release composition of the present invention may be used with labels having permanent, repositionable or removable adhesives. The particular composition of the release layer depends on the type of adhesive that is appropriate for the desired end use.

In accordance with the present invention, as embodied and broadly described herein, a composition is provided for use as a release for a permanent adhesive. This composition comprises a mixture of:

(a) about 50 to about 95 parts by weight polyethylene; and (b) about 5 to about 20 parts by weight silicon emulsion.

Preferably, the polyethylene has a melting point of 100° C. or higher. The polyethylene is preferably an emulsion and may be obtained from commercial sources such as MICHEM 460, from Michelman, Inc., which is a polyethylene emulsion, having a density of 8.3, a pH of 10.1, a melting point of 110° C., and a hardness of 1.5. Other emulsions that can be used include Michem 32535, 74040, 46025 and 6872 5, also from Michelman, Inc. Preferably, the composition contains about 80 to about 95 parts by weight polyethylene.

The silicon emulsion preferably contains an organopolysiloxane, such as methylhydrogen polysiloxane, for example, SYLOFF 1171 available from Dow Corning Corporation, or dimethyl polysiloxane, for example, "PC-107" available from Rhone-Poulenc. Preferably, the composition contains about 5 parts by weight silicon emulsion.

The composition may further comprise up to about 20 parts by weight ethylene vinyl chloride copolymer. The ethylene vinyl chloride copolymer blend may be, for example, VALCOAT 531 available from Air Products & Chemicals, Inc.

The composition may also contain other additives which do not adversely affect the desired properties of the release, such as pigments, thickeners, binders and amphipathic materials.

Examples of pigments that can be included in the thermal transfer primer coating composition include, for example, BURGESS No. 28, available from Burgess Pigment, and SUPERMITE, available from ECC International. A vinyl acetate ethylene binder also may be used in the thermal transfer barrier coating composition of the invention, such as AIRFLEX 1650, from Air Products. Examples of suitable binders that can be included in the thermal transfer barrier coating composition include, for example, AIRFLEX 100 HS from Air Products Corp., CARGILL 6431 from Cargill, KRISTALEX 3070 from Hercules, REICHHOLD 68-010 from Reichhold Chemical, and UCAR LATEX 376 from Union Carbide. Amphipathic materials that can be included in the release composition include ALIPAL CD-128 from GAF Corp., PLURONIC L-101 from BASF Corp., surfactant N-310 from Texaco, TEXAPHOR 963 from Henkel Corp., and TRITON GR5M from Union Carbide and amphipathic surfactant AEROSOL 22, $C_{26}H_{43}NO_{10}Na_4S$, from American Cyanamid Co. The amphipathic materials increase he release and printing properties.

In accordance with the invention, as embodied and broadly described herein, a composition is provided for use as a release for a repositionable adhesive which comprises a mixture of:

(a) a major amount of ethylene vinyl chloride copolymer; and (b) a minor amount of a polyethylene emulsion.

Polyethylene emulsions that can be used in the invention include, but are not limited to, MICHEM 460, MICHEM 32535 MICHEM 68725, MICHEM 74040 and MICHEM 46025. Preferably, the composition contains about 60 to about 90 parts by weight ethylene vinyl chloride copolymer, and most preferably about 75 parts by weight ethylene vinyl chloride copolymer.

Ethylene vinyl chloride copolymers blends that can be used in the invention include, but are not limited to, VAL-COAT 531. Preferably, the composition contains about 10 to about 40 parts by weight polyethylene emulsion, and most preferably about 25 parts by weight polyethylene emulsion.

The composition can also contain other additives which do not adversely affect the desired properties of the release, such as the pigments, thickeners, binders and amphipathic materials described above.

In accordance with the invention, as embodied and broadly described herein, a release composition is provided which comprises:

(a) about 10 to about 80 parts by wet weight of a surfactant; and (b) about 20 to about 90 parts by wet weight of an acrylic copolymer.

The surfactant may be selected from, for example, sulfosuccinamate compounds, preferably tetrasodium N-(1,2-dicarboxyethyl)-N-octadecyl sulfosuccinamate. Other surfactants include SURFACT M-310 (Texaco), ALIPAL CD-128 (GAF Corp) and TRITON GR5M (Union Carbide). A particular sulfosuccinamate that may be used in the invention is AEROSOL 22, available from American Cyanamid Co. The release composition preferably contains about 20 to about 60 parts by weight of a surfactant. The composition may also contain calcium stearate, in a MICHEM 170 emulsion.

The acrylic copolymer may be selected from, for example, commercial formulations such as ACRYSOL ASE-60 from Rohm and Haas Co. Another source is ALCOGUM L-31, from Alco Chemicals. The release composition preferably contains about 40 to about 80 parts by weight of an acrylic copolymer.

The release composition described above comprising a surfactant and an acrylic polymer is particularly suited for use as an ink-jet printable release. The release composition works well with the ink-jet to accept ink due to proper porosity and release. The ink is partially absorbed into the substrate so that it dries-quickly and does not feather. Water based ink-jet, such as VideoJet, produces better print quality and drying times with formulas consisting of at least 50 parts of acrylic polymer. Better print quality and drying time for oil based ink-jet, such as Trident, require at least 60 parts of the acrylic polymer.

The release suited for use as an ink-jet printable release may also contain about 10 to about 20 parts by weight calcium stearate emulsion such as MICHEM 170 by Michelman, Inc. for enhanced edge definition.

The ink-jet printable release may be coated on substrates, preferably 20# or 24# standard paper, such as 24# Union Camp Alkaline. The inkjet release compositions are preferably coated at 0.37–1.8 gsm using a meyer rod, dahlgren, reverse roll, direct gravure, reverse gravure, direct and offset flexo. The release layer is printable with flexor litho, gravure and dot matrix and laser.

Any of the release compositions described above may be coated on a substrate such as paper to obtain an article, preferably a label. The article may be prepared by coating the release composition onto at least a portion of one side of the substrate. A layer of a thermal transfer primer coating may be juxtaposed between the substrate and the release layer.

The article may contain a permanent or repositionable adhesive depending on its intended use. The release layer composition should be selected accordingly. The adhesive is applied either on the side of the substrate opposite the release layer, e.g., a linerless label, or on at least a portion of one side of a different substrate, wherein the adhesive layer is n juxtaposed contact with the release layer, e.g., a linered label.

Improved image quality may be obtained on plain paper (e.g., Finch Fine 24# stock) if the paper has been pre-coated with a thermal transfer primer coating. A thermal transfer primer coating provides for a smoother contact surface between the paper and the printhead. It also acts as an insulating layer or barrier by keeping the heat generated during the printing operation from penetrating into the paper. Printing ribbons have a wax coating which melts to release the ink. By keeping the heat on the surface, the ink is forced to print on the release surface, improving the print quality and producing a superior image. The thermal transfer primer coating also functions to bind the release coating to the substrate, enhancing the scratch and scuff resistance of the release.

Instead of a thermal transfer primer coating, a barrier coating may be provided between the substrate and the release, which may be, for example, vinyl acetate/ethylene copolymers such as AIRFLEX 1650 by Air Products.

In accordance with the invention, as embodied and broadly described herein, an article is provided comprising a substrate, a thermal transfer primer coating coated on the substrate, and a release layer coated on the thermal transfer primer coating. The thermal transfer primer coating comprises:

(a) about 20 to about 50 parts by weight of a latex; and
(b) about 50 to about 80 parts by weight pigment.

The pigment may be selected from, for example, ROPAQUE 84, by Rohm and Haas Co. The pigment preferably has a small particle size to obtain a smooth coating. Preferably, the thermal transfer primer coating includes about 80 parts by weight of pigment.

The latex may be, for example, commercial formulations such as LATEX 620 by Dow Chemical. Preferably, the thermal transfer primer coating includes about 20 parts by weight of a latex.

The substrate usable in the invention are preferably #24 or #20 paper. Commercial paper may be used such as 20# Finch Fine, Consolidated, and other types of thermal transfer sheets commercially available. Other substrates include films, TYVEK, polyester, and the like. The coating weight of the thermal transfer primer coating is preferably 2.5 to 4.0 gsm, and more preferably 2.8 gsm to 3.8 gsm. The coating weight of the release composition is preferably 5.0 gsm to 8.0 gsm, and more preferably 5.6 gsm to 7.5 gsm.

The substrate is precoated with the thermal transfer primer coating, if desired, then a release composition is prepared and coated on the thermal transfer primer coating, or on the substrate if no thermal transfer primer coating is present, using a coater, such as a Meyer Rod coater. Alternate methods are dahlgren, flexo, gravure blade or roll to roll. Preferably, a No. 28 Meyer Rod is used. A Meyer Rod is a coating rod or bar having different size diameters that can be selected for applying different amounts of coating.

The-release composition described above comprising a surfactant and an acrylic polymer is particularly suited for use as an ink-jet printable release.

Water based ink-jet, such as VideoJet, produces better print quality and dry times with formulas consisting of at least 50 parts of acrylic polymer. Better print quality and dry time for oil based ink-jet, such as Trident, require at least 60 parts of the acrylic polymer.

The ink-jet printable release may also contain 10 to 20 parts calcium stearate emulsion such as MICHEM 170 by Michelman, Inc. for enhanced edge definition.

The ink-jet printable release is coated on substrates, preferably 20# or 24# standard paper, such as 24# Union Camp Alkaline.

The ink-jet release compositions are preferably coated at 0.37–1.8 gsm using a meyer rod, dahlgren, reverse roll, direct gravure, reverse gravure, direct and offset flexo. The release layer is printable with flexo, litho, gravure and dot matrix.

The following examples are illustrative, and are not intended to limit the scope of the present invention.

Examples 1 and 2 are directed to release compositions for use with repositionable adhesives.

EXAMPLE 1

A substrate was prepared by precoating with a thermal transfer primer coating.

Substrate: 24# Finch Fine Paper

| Thermal transfer primer coating: | 80 parts RCPAQUE 84 |
| --- | --- |
| | 20 parts LATEX 620 |
| | Coat weight of 2.82 gsm |

A release composition was prepared and coated on the thermal transfer primer coating of the substrate using a Meyer Rod coater with a No. 28 meyer rod.

| Release: | 50 parts AEROSOL 22 Surfactant |
| --- | --- |
| | 50 parts ACRYSOL ASE 60 |
| | Coat weight of 5.64 gsm |

Two week accelerated aging (AA) delamination values were in the 1.0–2.0 oz/in range. AA was performed under heated conditions of 120° F.

EXAMPLE 2

Substrate: 24# Consolidated Thermal Transfer Paper

A release composition was prepared and coated on the substrate.

| | |
|---|---|
| Release: | 30 parts AEROSOL 22 |
| | 70 parts ACRYSOL ASE-60 |
| | Coat weight 6.76 gsm |

Two week AA delamination values were in the 1.0–2.0 oz/in range.

In examples 3–5, trials were conducted using the Meyer Rod coater to produce a permanent printable release for use with a permanent adhesive.

EXAMPLE 3

A substrate was prepared by precoating with a thermal transfer primer coating.

Substrate: 24# Finch Fine paper

| | |
|---|---|
| Thermal transfer primer coating: | 80 parts ROPAQUE 84 |
| | 20 parts LATEX 620 |
| | coat weight 3.76 gsm |

A release composition was prepared and coated on the thermal transfer primer coating.

| | |
|---|---|
| Release: | 75 parts - Polyethylene, MICHEM 460 |
| | 15 parts - Ethylene Vinyl Chloride, VALCOAT 531 |
| | 10 parts - Silicone Emulsion, PCL 107 |
| | coat weight 7.5 gsm |

EXAMPLE 4

A substrate was prepared by precoating with a thermal transfer primer coating.

| | |
|---|---|
| Substrate: | 24# Finch Fine paper |
| Thermal transfer primer coating: | 80 parts ROPAQUE 84 |
| | 20 parts LATEX 620 |
| | coat weight 2.82 – 3.76 gsm |

A release composition was prepared and coated on the thermal transfer primer coating.

| | |
|---|---|
| Release: | 80 parts Polyethylene, (MICHEM 460) |
| | 10 parts VALCOAT 531 |
| | 10 parts PCL 107 |
| | coat weight 5.65 – 7.5 gsm |

EXAMPLE 5

A substrate was prepared by precoating with a barrier coating.

| | |
|---|---|
| Substrate: | 24# Finch Fine paper |
| Barrier: | Vinyl Acetate/Ethylene Copolymer, AIRFLEX 1650 |
| | coat weight 2.8 – 6.5 gsm |

A release composition was prepared and coated on the barrier coating.

| | |
|---|---|
| Release: | 90 parts Polyethylene MICHEM 460 |
| | 10 parts SYLCFF 1171 |
| | coat weight 5.6 – 7.5 gsm |

None of the materials alone meets all the requirements for a good printable release. However, proper blends offer acceptable print and release.

In examples 6–8, trials were conducted using dahlgren to produce an ink-jet printable release. After a 2 week accelerated aging test at 120° F, delamination values of less than 2.7 oz/in were obtained.

EXAMPLE 6

A substrate was coated with a release composition.

| | |
|---|---|
| Substrate: | 24# Union Camp Alkaline |
| Release: | 50 parts AEROSOL 22 |
| | 50 parts ASE-60 |
| | coat weight 1.5 gsm |

EXAMPLE 7

A substrate was coated with a release composition.

| | |
|---|---|
| Substrate: | 24# Union Camp Alkaline |
| Release: | 20 parts AEROSOL 22 |
| | 80 parts ASE-60 |
| | coat weight 1.3 gsm |

EXAMPLE 8

A substrate was coated with a release composition.

| | |
|---|---|
| Substrate | 24# Union Camp Alkaline |
| Release: | 18 parts AEROSOL 22 |
| | 72 parts ASE-60 |
| | 10 parts MICHEM 170 |
| | coat weight 1.3 gsm |

Examples 6–8 exhibited good drying time, good dot uniformity and contrast and a good print contrast ratio greater than 75.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. An ink jet printable release composition comprising:
    (a) about 10 to about 80 parts by wet weight of a surfactant; and
    (b) about 20 to about 90 parts by wet weight of an acrylic copolymer.

2. The composition of claim 1, comprising:
    (a) about 20 to about 60 parts by weight surfactant; and
    (b) about 40 to about 80 parts by weight acrylic copolymer.

3. The composition of claim 1, wherein the surfactant is selected from sulfosuccinamate compounds.

4. The composition of claim 3, wherein the surfactant is tetrasodium N-(1,2-dicarboxyethyl)-N-octadecyl sulfosuccinamate.

5. An article comprising a substrate and a release layer comprising the composition of claim 1 coated onto at least a portion of one side of the substrate.

6. The article of claim 5, further comprising a layer of a thermal transfer primer coating juxtaposed between the substrate and the release layer.

7. The article of claim 6, wherein the substrate is paper.

8. The article of claim 6, further comprising a permanent adhesive located on the side of the substrate opposite the release layer.

9. The article of claim 8, wherein the article is a linerless label.

10. The article of claim 6, further comprising a layer of a repositionable adhesive coated on at least a portion of one side of a different substrate, wherein the adhesive layer is in juxtaposed contact with the release layer.

11. The composition of claim 1, wherein said acrylic copolymer is present in an amount of at least about 50 parts by wet weight.

12. The composition of claim 1, wherein said acrylic copolymer is present in an amount of at least about 60 parts by wet weight.

13. The composition of claim 1, further comprising about 10 to about 20 parts by wet weight calcium stearate.

14. The composition of claim 11, further comprising about 10 to about 20 parts by wet weight calcium stearate.

15. The composition of claim 12, further comprising about 10 to about 20 parts by wet weight calcium stearate.

16. The composition of claim 1, wherein said acrylic copolymer is present in an amount of at least about 50 percent by wet weight based on the total weight of the composition.

17. The composition of claim 1, wherein said acrylic copolymer is present in an amount of at least about 60 percent by wet weight based on the total weight of the composition.

18. The article of claim 5, wherein the release layer is present at a coating weight ranging from about 0.37 to about 1.8 grams/sq.meter.

19. A method of enhancing the print quality and printing performance of ink jet printing on a substrate comprising:
   coating onto the substrate the composition of claim 1; and
   creating images on the coated substrate by ink jet printing.

20. The method of claim 19, wherein said coating comprises the composition of claim 16, and said ink jet printing is water based ink jet printing.

21. The method of claim 19, wherein said coating comprises the composition of claim 17, and said ink jet printing is oil based ink jet printing.

* * * * *